United States Patent
Xu et al.

(10) Patent No.: US 12,159,731 B2
(45) Date of Patent: Dec. 3, 2024

(54) ATF OIL AND CORONA-RESISTANT ENAMELED WIRE FOR ELECTRIC VEHICLE MOTOR AND PREPARATION METHOD THEREOF

(71) Applicant: SUZHOU JUFENG ELECTRICAL INSULATION SYSTEM CO., LTD., Suzhou (CN)

(72) Inventors: Weihong Xu, Suzhou (CN); Yu Xia, Suzhou (CN); Cheng Zhou, Suzhou (CN); Guo Li, Suzhou (CN)

(73) Assignee: SUZHOU JUFENG ELECTRICAL INSULATION SYSTEM CO., LTD., Suzhou (CN)

( * ) Notice: Subject to any disclaimer, the term of this patent is extended or adjusted under 35 U.S.C. 154(b) by 164 days.

(21) Appl. No.: 17/802,087

(22) PCT Filed: Aug. 25, 2020

(86) PCT No.: PCT/CN2020/111021
§ 371 (c)(1),
(2) Date: Aug. 24, 2022

(87) PCT Pub. No.: WO2021/208318
PCT Pub. Date: Oct. 21, 2021

(65) Prior Publication Data
US 2023/0079070 A1    Mar. 16, 2023

(30) Foreign Application Priority Data
Apr. 14, 2020   (CN) .......................... 202010290488.1

(51) Int. Cl.
*H01B 3/30*    (2006.01)
*C09D 5/02*    (2006.01)
(Continued)

(52) U.S. Cl.
CPC ............ *H01B 3/305* (2013.01); *C09D 5/022* (2013.01); *C09D 7/45* (2018.01); *C09D 7/61* (2018.01);
(Continued)

(58) Field of Classification Search
CPC .............................. H01B 3/305; H01B 7/0225
See application file for complete search history.

(56) References Cited

U.S. PATENT DOCUMENTS 10,418,151 B2*   9/2019  Muto ................. H02K 3/30
2023/0047864 A1*  2/2023  Zhang ............... H01B 7/0225

FOREIGN PATENT DOCUMENTS

CN    101958158 A    1/2011
CN    207409287 U    5/2018
(Continued)

*Primary Examiner* — Chau N Nguyen
(74) *Attorney, Agent, or Firm* — SZDC Law PC

(57) ABSTRACT

Provided is an ATF (Automatic Transmission Fluid) oil and corona-resistant enameled wire for electric vehicle motors, belonging to the insulating materials field. The ATF oil and corona-resistant enameled wire for electric vehicle motors comprises a copper conductor and an insulating layer, wherein said insulating layer from inside to outside is composed of ATF oil and corona-resistant protective film, corona-resistant PAI film, ATF oil and corona-resistant protective film, corona-resistant PAI film, ATF oil and corona-resistant protective film. The ATF oil and corona resistant enameled wire of this disclosure is suitable for the preparation of oil-cooled electric vehicle motor loose winding coil due to the advantages of good manufacturability, excellent ATF oil and corona resistance, and low manufacturing cost.

8 Claims, 1 Drawing Sheet

(51) Int. Cl.
*C09D 7/40* (2018.01)
*C09D 7/45* (2018.01)
*C09D 7/61* (2018.01)
*C09D 7/63* (2018.01)
*C09D 179/08* (2006.01)
*H01B 7/02* (2006.01)
*H01B 7/28* (2006.01)
*H01B 13/06* (2006.01)
*C08K 3/36* (2006.01)
*C08K 5/3415* (2006.01)

(52) U.S. Cl.
CPC .............. *C09D 7/63* (2018.01); *C09D 7/67* (2018.01); *C09D 179/08* (2013.01); *H01B 7/0225* (2013.01); *H01B 7/2806* (2013.01); *H01B 7/2813* (2013.01); *H01B 13/065* (2013.01); *C08K 3/36* (2013.01); *C08K 5/3415* (2013.01); *C08K 2201/011* (2013.01)

(56) References Cited

FOREIGN PATENT DOCUMENTS

| | | |
|---|---|---|
| CN | 111508639 A | 8/2020 |
| JP | H02189814 A | 7/1990 |

\* cited by examiner

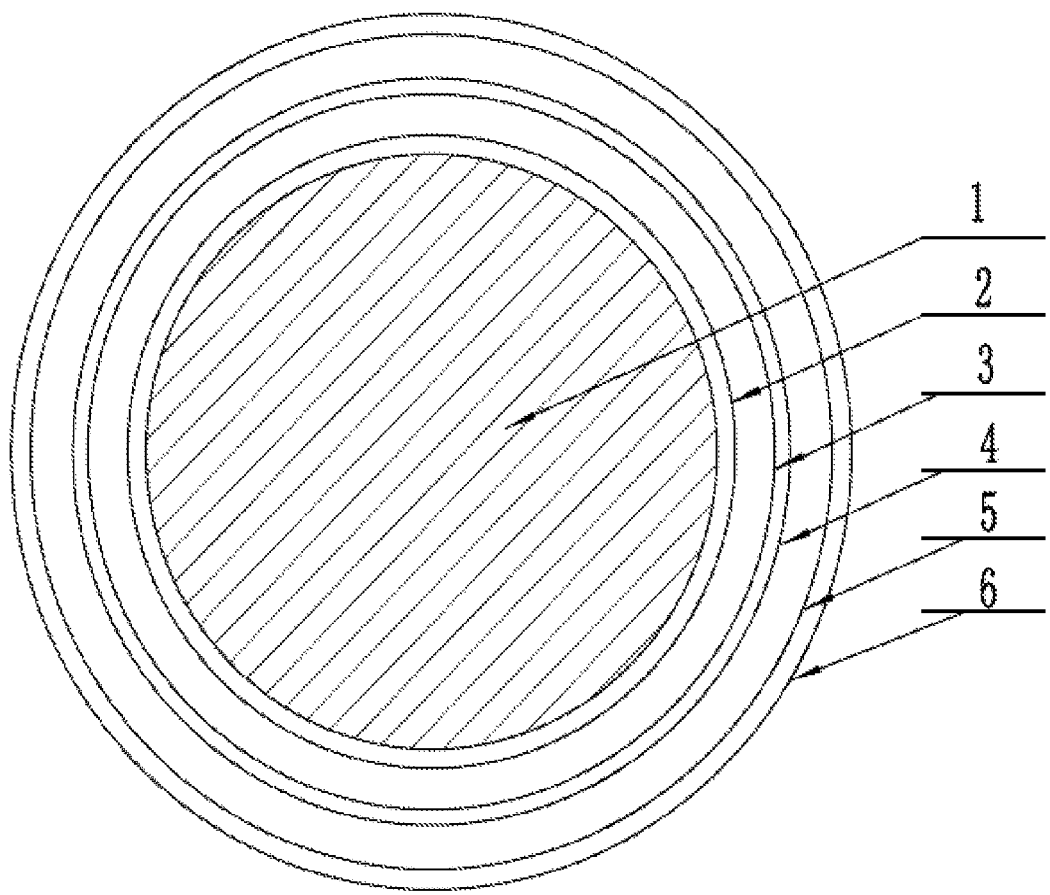

ATF OIL AND CORONA-RESISTANT ENAMELED WIRE FOR ELECTRIC VEHICLE MOTOR AND PREPARATION METHOD THEREOF

This application is the National Stage Application of PCT/CN2020/111021, filed on Aug. 25, 2020, which claims priority to Chinese Patent Application No. 202010290488.1, filed on Apr. 14, 2020, which is incorporated by reference for all purposes as if fully set forth herein.

FIELD OF THE INVENTION

This invention belongs to the insulating materials field, and specifically relates to an ATF oil and corona-resistant enameled wire for electric vehicle motors and a preparation method thereof, particularly to an ATF oil and corona-resistant enameled wire and a preparation method thereof, which is mainly applied to the preparation of motor loose winding coils for oil-cooled electric automobiles.

BACKGROUND

The cooling mode of electric automobile motor may be composed of water-cooled mode and oil-cooled mode. The oil-cooled mode uses transmission oil (AFT oil) for cooling. The insulation materials directly contact with the ATF oil in use. While some of them with poor oil resistance suffering from long-term corrosion of ATF oil would result in significant performance degradation, thereby seriously affecting the operating life and reliability of the motor.

As the main insulating material of the motor, the corona-resistant enameled wire plays a decisive role in the service life of the motor. On the current market, the 200-grade corona-resistant Polyesterimide/Polyamideimide composite enameled wires are the main corona-resistant enameled wires products used in the electric vehicle motor. However, its application in oil-cooled motors is getting limited because of the tested poor ATF oil-resistant performance. Japan has a relatively leading technology which has successfully prepared a kind of single coating corona-resistant PAI (polyamideimide) enameled wire with good ATF oil-resistant property and wide application in oil-cooled motor throughout the world. However, the single coating corona-resistant PAI enameled wire is expensive due to Japanese technology monopoly, which increases the cost of the corona-resistant enameled wire; besides that, according to the results of the ATF oil resistance test, the film adhesion and corona resistant life performance need to be improved and optimized Chinese Pat. No. CN105219233B disclosed a preparation method for a corona-resistant enameled wire. The preparation method mainly includes: adding inorganic oxide materials into organic solvent, and then stirring and milling the mixture to obtain an inorganic oxide pre-dispersed fluid; adding coupling agent to the inorganic oxide pre-dispersed fluid to obtain a corona-resistant modifier; adding the corona-resistant modifier agent to a fluid paint and then stirring them to obtain a corona-resistant wire enamel. The solid content of the corona-resistant wire enamel prepared by this method for inverter motor is 41.97-43.8%, the viscosity is 320-358 MPS at 25, and the inverter surge-resistance life of the enameled wire is 135-169 h (test condition: temperature 155±2° C., peak-to-peak voltage 3 kV, pulse frequency 20 kHz, pulse rise time 100 ns). The corona-resistant wire enamel of this disclosure could be prepared in room temperature, which has high solid content, low viscosity, good corona resistance and stability, low cost and strong operability.

Chinese Pat. No. CN106675401A disclosed a corona-resistant wire enamel and the preparation method thereof. The corona-resistant wire enamel composition included nano silicon dioxide, nano titanium dioxide, nano aluminum oxide, KH-560, sulfonated polyetheramine-hyperbranched polypyridromic copolymer, deionized water and N-methyl pyrrolidinone. The preparation method is to mix and stir all the chemical raw material components to obtain the corona-resistant wire enamel. The performance tests were applied on the corona-resistant electromagnetic wire. After hot punching with the temperature of 220° C. for 30 min, it was found that the performance of the sample was qualified. The corona resistance life was 255 h at 48 kV of breakdown voltage, and 156 h at 30 kV of breakdown voltage. However, the production process is complicated due to the excessive chemical raw material components.

Chinese Pat. No. CN106543890B provided a preparation method for PAI wire enamel through the nanoparticle-modification technology. The preparation method is as follows: carrying out the polycondensation reaction of aluminum isopropanol and methyl triethoxysilane to obtain nano silicon/aluminum oxide dispersion; then mixing N-methyl pyrrolidone, trimellitic anhydride with formic acid to obtain a mixture fluid, and then adding the nano silicon/aluminum oxide dispersion, 4,4'-diphenylmethane diisocyanate, xylene, benzyl alcohol successively; after heating and cooling, adding n-methylpyrrolidone and xylene mixed solvent to adjust the solid content; and then adding high temperature curing catalyst to obtain the corona-resistant wire enamel product. The performance of the prepared sample was tested. The corona resistance life of the corona-resistant PAI wire enamels containing 20 wt % of the inorganic nanomaterial was 40 h under the conditions of normal temperature, power frequency and electric field strength of 60 kV/mm, which was more than 20 times that of the unmodified enamels. However, this method is not suitable for large-scale industrial production due to its short breakdown life and complicated preparation process. Currently, the excellent corona-resistant wire enamels with better corona-resistant life and greater storage stability, are expensive and high-costed, and not suitable for industrial production. Therefore, it is imperative to develop a kind of wire enamel with low production cost, excellent ATF oil and corona resistance to meet the technical requirements for the development and application of oil-cooled electric vehicle motors.

SUMMARY

It is therefore an object of this disclosure to provide an ATF-resistant corona-resistant enameled wire and the preparation method thereof to overcome the issue mentioned above. Provided corona-resistant enameled wire with excellent corona resistant life, is made from low-cost and readily available chemical raw materials.

In order to achieve the object, the present disclosure comprises:
    an ATF oil and corona-resistant enameled wire for electric vehicle motors, comprising a copper conductor and an insulating layer, wherein from inside to outside the insulating layer is composed of ATF oil and corona-resistant protective film, corona-resistant PAI film, ATF oil resistant and corona-resistant protective film, corona-resistant PAI film, ATF oil and corona-resistant protective film;

furthermore, the film thickness ratios of the ATF oil and corona-resistant protective film, the corona-resistant PAI film, the ATF oil resistant and corona-resistant protective film, the corona-resistant PAI film, the ATF oil and corona-resistant protective film are 5-12%, 30-45%, 5-12%, 30-45%, 5-12%, respectively;

preferably, the film thickness ratios of the ATF oil and corona-resistant protective film, the corona-resistant PAI film, the ATF oil resistant and corona-resistant protective film, the corona-resistant PAI film, the ATF oil and corona-resistant protective film are 5-8%, 35-40%, 6-9%, 38-40%, 8-10%, respectively;

additionally, the corona-resistant PAI film is made up of corona-resistant PAI wire enamel based on modified nano silicon dioxide and/or modified nano aluminum oxide, wherein the preparation comprises: adding 5-10 wt % of nano-powders to the fluid PAI paint (solid content: 25-38%) to obtain a mixture fluid, homogenizing the mixture fluid for 1-2 h with a speed of 5000-8000 r/min in a homogeneous emulsion machine (controlling the temperature ≤60° C. with cooling water) to obtain a suspensions; and then grinding and dispersing the suspension in a ball mill machine for 3-5 h to D50≤100 nm (controlling the temperature ≤60° C. with cooling water) to obtain a dispersion, after that filtering the dispersion with 3000-mesh filter bags at high pressure to obtain corona-resistant PAI enamel;

in addition, the nano-powders is nano silicon dioxide and/or nano aluminium oxide with the average particle size of 30-60 nm;

furthermore, the ATF oil and corona-resistant protective film is made up of nanoparticle-modified engineering plastic enamel, and the preparation method of the enamel is as follows:

(1) adding N, N-dimethylpyrrolidone to dispersant for dispersion, then adding inorganic filler for emulsification, and then cooling to obtain nano-slurry;

(2) adding the nano-slurry from step (1) to engineering plastic solution, and then stirring and grinding to obtain material 1;

(3) adding N, N-dimethylpyrrolidone to the material 1 from step (2), and stirring to obtain the nanoparticle-modified engineering plastic enamel.

wherein in step (1), the N, N-dimethylpyrrolidone is 75-100 kg, the dispersant is 3-5 kg, the inorganic filler is 75-100 kg, and completing adding the inorganic filler within 20-30 min; preferably, the mass ratio of the N, N-dimethylpyrrolidone, the dispersant and the inorganic filler in step (1) is 18-30:1:20-28; the dispersant is single or multiple components of BYK110, BYK163 and KH560; the inorganic fillers is nano silica dioxide or nano aluminum oxide; the dispersing speed is 2000-2500 r/min with 3-5 min of the dispersing time; the emulsifying speed is 8000-9000 r/min with 2-3 h of the emulsifying time; the cooling temperature is below 50° C.;

in step (2), the nano-slurry is 5-15 kg with 40-50% of the solid content; and the engineering plastic solution is prepared as follows: adding certain amount of engineering plastic to the N, N-dimethylpyrrolidone (controlling the solid content of 30-40%, and the mass ratio of engineering plastics to N, N-dimethylpyrrolidone is 1:1.5-2.5), and stirring with 500-1500 r/min of stirring speed until dissolved to obtain the engineering plastic solution; the engineering plastics is single or multiple components of polycarbonate, polyformaldehyde, polyphenylene sulfide, polyether sulfone and polyether ether ketone; the engineering plastic solution is 60-100 kg; preferably, the stirring speed is 500-800 r/min, and the stirring time is 1-1.5 h; the grinding size is D50<100 nm;

in step (3), the added N, N-dimethylpyrrolidone is 12-35 kg; the stirring temperature is 30-60° C. and the stirring time is 1-2 h; the solid content of the nanoparticle-modified engineering plastic enamel is 25-35%;

The present disclosure further provided a preparation method for the ATF oil and corona-resistant enameled wire, comprising:

S1: providing copper conductor wires;
S2: annealing for 20-150 s at 490° C./470° C., wherein 490° C. for inlet section and 470° C. for outlet section;
S3: enameling via dies;
S4: baking for 3-10 min at 560-580° C.;
S5: cooling, and online monitoring;
S6: automatically collecting the products.

Superior to the prior art, the advantages of the invention are:

(1) The ATF oil resistant performance of the enameled wire prepared by this disclosure is obviously improved, and the performance indicator retention rate is more than 80% after 8 cycles of the high and low temperature test in ATF oil.

(2) The enameled wire prepared by this disclosure has excellent corona resistant life; according to the national standard test, the corona resistant life of the secondary coating enameled wire with 0.8 mm wire gauge >100 h.

(3) The self-lubricating enameled wire of this disclosure could avoid friction damage of the enamel film when collecting from the production line, thereby achieving a high copper space factor; moreover, the preparation cost is low and the raw materials components are easy to obtain.

BRIEF DESCRIPTION OF THE DRAWINGS

FIG. 1. is the structure diagram of enameled wire, in which 1—copper conductor; 2—ATF oil and corona-resistant protective film; 3—corona-resistant PAI film; 4—ATF oil and corona-resistant protective film; 5—corona-resistant PAI film; 6—ATF-oil and corona-resistant protective film.

DETAILED DESCRIPTION OF THE INVENTION

Below are further described the specific implementation way of the present invention in conjunction with the drawings and examples for better understanding of the present disclosure, wherein the terms used in the following embodiments are used to clarify specific concrete embodiments but shall not limit the scope of this invention. The raw materials used in the embodiments are all common commercially available products, thus there is no need to specify their sources.

Embodiment 1

The present embodiment provided an ATF oil and corona-resistant enameled wire for electric vehicle motors as shown in FIG. 1, comprising a copper conductor 1 and an insulating layer, wherein said insulating layer from inside to outside is composed of ATF oil and corona-resistant protective film 2, corona-resistant PAI film 3, ATF oil resistant and corona-resistant protective film 4, corona-resistant PAI film 5, ATF oil and corona-resistant protective film 6. The ATF oil and corona-resistant enameled wire for electric vehicle motors could be prepared by the following steps:

using polycrystalline coating dies to prepare the ATF oil and corona-resistant enameled wires in horizontal enameled wire production lines, wherein copper wire annealing temperature is 490° C./470° C., curing temperature of the drying tunnel is 580° C., production line speed is 120-130 m/min, wire gauge is 0.8 mm, secondary coating film is applied on the enameled wires; coating the ATF oil and corona-resistant protective film with 5% of the coating thickness ratio, the corona-resistant PAI film with 40% of the coating thickness ratio, the ATF oil resistant and corona-resistant protective film with 9% of the coating thickness ratio, the corona-resistant PAI film with 38% of the coating thickness ratio, the ATF oil and corona-resistant protective film with 8% of the coating thickness ratio.

The enamel composition for the corona-resistant PAI film is prepared as follows: adding 10.2 kg of nano-$SiO_2$ (average particle size: 45 nm) to 150 kg of fluid PAI paint (solid content: 31%) to obtain a mixture fluid; homogenizing the mixture fluid for 2 h with a speed of 5500 r/min in a homogeneous emulsion machine (controlling the temperature ≤60° C. with cooling water) to obtain a suspensions; grinding and dispersing the suspension in a ball mill machine for 3.5 h to D50≤100 nm (controlling the temperature ≤60° C. with cooling water) to obtain a dispersion; filtering the dispersion with 3000-mesh filter bags at high pressure to obtain corona-resistant PAI enamel.

The enamel composition for the ATF oil and corona-resistant protective film is prepared as follows:
(1) adding 5 kg of BYK110 dispersant to 100 kg of N, N-dimethylpyrrolidone, dispersing for 3 min at a speed of 5500 r/min in a homogeneous emulsion machine, stirring and gradually adding 100 kg of 45 nm nano-$SiO_2$ within 30 min, then changing the speed to 8000 r/min, and homogeneously emulsifying for 2-3 h, and then using cooling water to control the temperature ≤50° C. to obtain 15 kg of the nanoparticle slurry;
(2) adding 15 kg of the nanoparticle slurry to 100 kg of Polyethersulfone/N, N-dimethylpyrrolidone suspension with 35% solid content, stirring and dispersing at a speed of 500 r/min in a disc mixer, and then grinding and dispersing to D50<100 nm in a nano ball mill machine, after that mixing with 30 kg N, N-dimethylpyrrolidone in a mixing tank, stirring the mixture for 1.5 h at 40° C. stirring temperature to obtain the ATF oil and corona-resistant protective enamel with 29.18% solid content.

The mentioned-above Polyethersulfone/N, N-dimethylpyrrolidone suspension with 35% solid content is prepared as follows: adding 50 kg of polyethersulfone to 93 kg of N, N-dimethylpyrrolidone, and stirring in a disc mixer at a stirring speed of 800 r/min to disperse homogeneously to obtain the Polyethersulfone/N, N-dimethylpyrrolidone suspension with 35% solid content.

Embodiment 2

The present embodiment provided an ATF oil and corona-resistant enameled wire for electric vehicle motors, comprising a copper conductor and an insulating layer, wherein said insulating layer from inside to outside is composed of ATF oil and corona-resistant protective coating, corona-resistant PAI coating, ATF oil resistant and corona-resistant protective coating, corona-resistant PAI coating, ATF oil and corona-resistant protective coating. The ATF oil and corona-resistant enameled wire for electric vehicle motors could be prepared by the following steps:

using polycrystalline coating dies to prepare the ATF oil and corona-resistant enameled wires in horizontal enameled wire production lines, wherein copper wire annealing temperature is 490° C./470° C., curing temperature of the drying tunnel is 560° C., production line speed is 120-130 m/min, wire gauge is 0.8 mm, secondary coating film is operated on the enameled wires; coating the ATF oil and corona-resistant protective film with 7% coating thickness ratio, the corona-resistant PAI film with 35% coating thickness ratio, the ATF oil resistant and corona-resistant protective film with 8% coating thickness ratio, the corona-resistant PAI film with 40% coating thickness ratio, the ATF oil and corona-resistant protective film with 10% coating thickness ratio.

The enamel composition for the corona-resistant PAI film is prepared as follows: adding 6.5 kg of nano-$SiO_2$ (average particle size: 40 nm) to 150 kg of fluid PAI paint (solid content: 30%) to obtain a mixture fluid; homogenizing the mixture fluid for 1.5 h with a speed of 6000 r/min in a homogeneous emulsion machine (at the same time using cooling water to control the temperature ≤60° C.) to obtain a suspensions; grinding and dispersing the suspension in a ball mill machine for 3.5 h to D50≤100 nm (at the same time using cooling water to control the temperature ≤60° C.) to obtain a dispersion; filtering the dispersion with 3000 mesh filter bags at high pressure to obtain corona-resistant PAI enamel.

The enamel composition for the ATF oil and corona-resistant protective film is prepared as follows:
(1) adding 3 kg of BYK163 dispersant to 85 kg of N, N-dimethylpyrrolidone, dispersing for 5 min at a speed of 2500 r/min in a homogeneous emulsion machine, stirring and gradually adding 75 kg of 50 nm nano-$SiO_2$ within 30 min, changing the speed to 9000 r/min, homogeneously emulsifying for 3 h, and then using cooling water to control the temperature ≤50° C. to obtain the nanoparticle slurry;
(2) adding 10 kg of the nanoparticle slurry to 60 kg of the polyethersulfone/N, N-dimethylpyrrolidone suspension with 35% solid content, and stirring and dispersing for 1.5 h at a speed of 600 r/min in a disc mixer, then grinding and dispersing to D50<100 nm in a nano ball mill machine, after that mixing with 30 kg N, N-dimethylpyrrolidone in a mixing tank, stirring the mixture for 2 h at 40° C. stirring temperature to obtain the ATF oil and corona-resistant protective enamel with 28.45% solid content.

The aforesaid polyethersulfone/N, N-dimethylpyrrolidone suspension with 35% solid content is prepared as follows: adding 75 kg of polyethersulfone to 139.3 kg of N, N-dimethylpyrrolidone, and stirring in a disc mixer at a stirring speed of 650 r/min to disperse homogeneously to obtain the polyethersulfone/N, N-dimethylpyrrolidone suspension with 35% solid content.

Embodiment 3

This present embodiment provided an ATF oil and corona-resistant enameled wire for electric vehicle motors, comprising a copper conductor and an insulating layer, wherein said insulating layer from inside to outside is composed of ATF oil and corona-resistant protective film, corona-resistant PAI film, ATF oil resistant and corona-resistant protective film, corona-resistant PAI film, ATF oil and corona-resistant protective film. The ATF oil and corona-resistant enameled wire for electric vehicle motors could be prepared by the following steps:

using polycrystalline coating dies to prepare the ATF oil and corona-resistant enameled wires in horizontal enameled wire production lines, wherein copper wire annealing temperature is 490° C./470° C., curing temperature of the drying tunnel is 580° C., production line speed is 120-130 m/min, wire gauge is 0.8 mm, secondary coating film is applied on the enameled wires; coating the ATF oil and corona-resistant protective film with 8% of the coating thickness ratio, the corona-resistant PAI film with 38% of the coating thickness ratio, the ATF oil resistant and corona-resistant protective film with 6% of the coating thickness ratio, the corona-resistant PAI film with 39% of the coating thickness ratio, the ATF oil and corona-resistant protective film with 9% of the coating thickness ratio.

The enamel composition for the corona-resistant PAI film was prepared as follows: adding 9.72 kg of nano-$SiO_2$ (average particle size: 50 nm) to 135 kg of fluid PAI paint (solid content: 30%) to obtain a mixture fluid; homogenizing the mixture fluid for 2 h with a speed of 6300 r/min in a homogeneous emulsion machine (controlling the temperature ≤60° C. with cooling water) to obtain a suspensions; then grinding and dispersing the suspension in a ball mill machine for 3.5 h to D50≤100 nm (controlling the temperature ≤60° C. with cooling water) to obtain a dispersion; filtering the dispersion with 3000-mesh filter bags at high pressure to obtain corona-resistant PAI enamel.

The enamel composition for the ATF oil and corona-resistant protective film was prepared as follows:

(1) adding 2.2 kg of BYK163 dispersant and 1 kg of KH560 to 75 kg of N, N-dimethylpyrrolidone, and dispersing for 5 min at a speed of 2300 r/min in a homogeneous emulsion machine, then stirring and gradually adding 62 kg of 56 nm nano-$SiO_2$ and 10 kg of 50 nm nano-$Al_2O_3$ within 30 min, after that changing the speed to 8500 r/min, and homogeneously emulsifying for 3 h, and then using cooling water to control the temperature ≤50° C. to obtain the nanoparticle slurry.

(2) adding 5 kg of the nanoparticle slurry to 35 kg of the polyethersulfone N, N-dimethylpyrrolidone suspension with 35% solid content, and stirring and dispersing for 1.5 h at a speed of 800 r/min in a disc mixer, and then grinding and dispersing to D50<100 nm in a nano ball mill machine, after that mixing with 12 kg N, N-dimethylpyrrolidone in a mixing tank for solid content adjustment to obtain the ATF oil and corona-resistant protective enamel.

The aforesaid Polyethersulfone/N, N-dimethylpyrrolidone suspension with 35% solid content was prepared as follows: adding 85 kg of polyethersulfone to 148.6 kg of N, N-dimethylpyrrolidone, and stirring in a disc mixer at a stirring speed of 650 r/min to disperse homogeneously to obtain the Polyethersulfone/N, N-dimethylpyrrolidone suspension with 35% solid content.

Embodiment 4

An ATF oil and corona-resistant enameled wire for electric vehicle motors was prepared via polycrystalline coating dies in horizontal enameled wire production lines, wherein the enamel composition and the preparation methods for the corona-resistant PAI film and the ATF oil and corona-resistant protective film were the same as in Embodiment 1. Whereas the coating thickness ratios of the five films are 8%, 30%, 12%, 45% and 5% respectively.

Embodiment 5

An ATF oil and corona-resistant enameled wire for electric vehicle motors was prepared via polycrystalline coating dies in horizontal enameled wire production lines, wherein the enamel composition and the preparation methods for the corona-resistant PAI film and the ATF oil and corona-resistant protective film were the same as in Embodiment 1. Whereas the coating thickness ratios of the five films are 12%, 45%, 5%, 30% and 8% respectively.

Comparative Example 1

A conventional corona-resistant enameled wire with composite coating on the market was prepared via polycrystalline coating dies in horizontal enameled wire production lines, wherein copper wire annealing temperature is 490° C./470° C., curing temperature of the drying tunnel is 580° C., production line speed is 120-130 m/min, wire gauge is 0.8 mm, secondary coating film is applied on the enameled wires; coating the corona-resistant polyimide film with 85% of the coating thickness ratio, the PAI film with 15% of the coating thickness ratio, Comparative Example 2

A corona-resistant enameled wire with a single PAI layer was prepared via polycrystalline coating dies in horizontal enameled wire production lines, wherein copper wire annealing temperature is 490° C./470° C., curing temperature of the drying tunnel is 580° C., production line speed is 120-130 m/min, wire gauge is 0.8 mm, secondary coating film is applied on the enameled wires; coating a single PAI layer.

Comparative Example 3

An ATF oil and corona-resistant enameled wire for electric vehicle motors was prepared via polycrystalline coating dies in horizontal enameled wire production lines, wherein the enamel composition and the preparation methods for the corona-resistant PAI film and the ATF oil and corona-resistant protective film were the same as in Embodiment 1. Whereas the coating thickness ratios of the five films are 16%, 49%, 3%, 28% and 4% respectively.

Comparative Example 3

An ATF oil and corona-resistant enameled wire for electric vehicle motors was prepared via polycrystalline coating dies in horizontal enameled wire production lines, wherein the enamel composition and the preparation methods for the corona-resistant PAI film and the ATF oil and corona-resistant protective film were the same as in Embodiment 1. Whereas the coating thickness ratios of the five films are 3%, 23%, 14%, 47% and 13% respectively.

Test:

The performance of the corona-resistant enameled wire of embodiments 1-5 and comparative examples 1~4 were tested, and the results were shown in Table 1 and Table 2.

1. The ATF oil resistance test method is that immersing the test samples in sealed tubes filled with ATF oil for 8 cycles of high and low temperature test. The temperature cycle scheme is as follows: heating up from 25° C. to 155° C., keeping at 155° C. for 40 h, then directly switching to −45° C., and keeping at −45° C. for 8 h, after that switching back to 155° C. to end up one cycle; carrying out 8 temperature cycles and switching back to 25° C. to continue other relevant performance tests. At the beginning of the test, the heating rate and cooling rate for the temperature change between 25° C. and 155° C. was about 2° C./min, during the test, the temperature was directly switched between 155° C. and −45° C. with temperature shock, and the switching time was 5-10 min.

2. Corona resistance life test conditions are as follows: high-frequency impulse test, square wave, temperature 155° C., frequency 20 kHz, pulse time 100 ns, voltage 3000V.

conventional corona-resistant enameled wire with composite coating on the market. As can be seen from the results of ATF oil resistant performance test in Table 2, the present enameled wire shows a poor performance with breakdown voltage of 5.53 kV, corona resistance life of 3:18 h:min, peeling-off in the jerk test, cracking in the elongation test. Comparative example 2 is a secondary coating corona-resistant enameled wire with a single PAI layer (coated with an imported single layer of corona-resistant PAI enamel). As can be seen from the performance test of Table 2, the present example exhibits a large static friction coefficient of 0.045, and corona resistant life of 109:36 h:min; and in the ATF oil resistant performance test, it also shows a poor performance with breakdown voltage of 10.82 kV, corona resistance life

TABLE 1

| | Performance Indicator | Embodiment 1 | Embodiment 2 | Embodiment 3 | Embodiment 4 | Embodiment 5 |
|---|---|---|---|---|---|---|
| | Static Friction Coefficient | 0.033 | 0.026 | 0.028 | 0.025 | 0.026 |
| | Jerking Test | no peeling-off | no peeling-off | no peeling-off | no peeling-off | no peeling-off |
| | Elongation Test (wrap tightly around the 1 d rod for 10 turns without cracking) | no cracking | no cracking | no cracking | no cracking | no cracking |
| | Break down Voltage (kv) | 15.36 | 15.65 | 15.82 | 15.69 | 15.37 |
| | Corona Resistance Life (h:min) | 116:35 | 128:26 | 121:15 | 120:39 | 118:52 |
| ATF Oil Resistance Performance (after 8 cycles of high and low temperature cycles in ATF oil) | Jerking Test | no peeling-off | no peeling-off | no peeling-off | no peeling-off | no peeling-off |
| | Elongation Test | no cracking | no cracking | no cracking | no cracking | no cracking |
| | Break down Voltage (kv) | 14.36 | 15.09 | 14.85 | 14.26 | 14.15 |
| | Corona Resistance Life (h:min) | 95:26 | 110:25 | 105:52 | 99:39 | 103:45 |

TABLE 2

| | Performance Indicator | Comparative Examples 1 | Comparative Examples 2 | Comparative Examples 3 | Comparative Examples 4 |
|---|---|---|---|---|---|
| | Static Friction Coefficient | 0.049 | 0.045 | 0.030 | 0.028 |
| | Jerking Test | no peeling-off | no peeling-off | no peeling-off | no peeling-off |
| | Elongation Test (wrap tightly around the 1 d rod for 10 turns without cracking) | no cracking | no cracking | no cracking | no cracking |
| | Break down Voltage (kv) | 15.39 | 15.52 | 15.52 | 15.36 |
| | Corona Resistance Life (h:min) | 36:52 | 109:36 | 115:28 | 95:36 |
| ATF Oil Resistance Performance (after 8 cycles of high and low temperature cycles in ATF oil) | Jerking Test | peeling-off | no peeling-off | peeling-off | no peeling-off |
| | Elongation Test | cracking | cracking | cracking | no cracking |
| | Break down Voltage (kv) | 5.53 | 10.82 | 9.69 | 14.16 |
| | Corona Resistance Life (h:min) | 3:18 | 59:12 | 73:29 | 65:16 |

According to Table 1, the corona resistant enameled wires of embodiments 1-5 has enhanced performances with static friction coefficient of 0.025-0.033, breakdown voltage of 15.36-15.69 kV, no peeling-off in the jerk test, no cracking in the elongation test, better corona resistance; moreover, it exhibits excellent performances in the jerk test, elongation test, and corona resistance life test of the ATF oil resistance performance test as well. The comparative example 1 is a of 59:12 h:min. The comparative examples 3-5 are all coated with 5 layers, whose thickness ratios are not included in the protection scope of the present disclosure. As can be seen from the performance test, especially the ATF oil resistance performance test, these examples show poor results.

The foregoing description has been made on several embodiments of this invention which are relatively specific and detailed, however the invention is not limited thereto. It should be further understood by those skilled in the art that various changes and modifications may be made without departing from the spirit of the invention are protected by this invention. Therefore, the scope of protection for this invention shall be subject to the appended claims.

What is claimed is:

1. An ATF (Automatic Transmission Fluid) oil and corona-resistant enameled wire for electric vehicle motors, comprising a copper conductor and an insulating layer, wherein from inside to outside said insulating layer is composed of ATF oil and corona-resistant protective film, corona-resistant PAI film, ATF oil resistant and corona-resistant protective film, corona-resistant PAI film, ATF oil and corona-resistant protective film, wherein said ATF oil and corona-resistant protective film is made up of nanoparticle-modified engineering plastic enamel, and the preparation method of the enamel is as follows:
(1) adding N, N-dimethylpyrrolidone to dispersant for dispersion, then adding inorganic filler for emulsification, and then cooling to obtain nano-slurry;
(2) adding said nano-slurry from step (1) to engineering plastic solution, and then stirring and grinding to obtain material 1;
(3) adding N, N-dimethylpyrrolidone to said material 1 from step (2), and stirring to obtain said nanoparticle-modified engineering plastic enamel.

2. An enameled wire according to claim 1 wherein the film thickness ratios of the ATF oil and corona-resistant protective film, the corona-resistant PAI film, the ATF oil resistant and corona-resistant protective film, the corona-resistant PAI film, the ATF oil and corona-resistant protective film are 5-12%, 30-45%, 5-12%, 30-45%, 5-12%, respectively.

3. An enameled wire according to claim 2 wherein the film thickness ratios of the ATF oil and corona-resistant protective film, the corona-resistant PAI film, the ATF oil resistant and corona-resistant protective film, the corona-resistant PAI film, the ATF oil and corona-resistant protective film are 5-8%, 35-40%, 6-9%, 38-40%, 8-10%, respectively.

4. An enameled wire according to claim 1 wherein said corona-resistant PAI film is made up of corona-resistant PAI wire enamel based on modified nano silicon dioxide and/or modified nano aluminum oxide.

5. An enameled wire according to claim 4 wherein the average particle size of said nano silicon dioxide and nano aluminum oxide is 40-60 nm.

6. An enameled wire according to claim 1 wherein the mass ratio of said N, N-dimethylpyrrolidone, said dispersant and said inorganic filler in step (1) is 18-30:1:20-28.

7. An enameled wire according to claim 1 wherein said engineering plastic in step (2) is single or multiple components of polycarbonate, polyformaldehyde, polyphenylene sulfide, polyethersulfone, and polyether ether ketone.

8. An enameled wire according to claim 1 wherein the grinding size of material 1 in Step (2) is D50<100 nm.

* * * * *